US006059916A

United States Patent [19]

Betschon

[11] Patent Number: 6,059,916

[45] Date of Patent: May 9, 2000

[54] PROCESS FOR THE MANUFACTURE OF A FOAM BODY FOR AN INK CARTRIDGE

[75] Inventor: Luzius Betschon, Uster, Switzerland

[73] Assignee: Pelikan Produktions AG, Switzerland

[21] Appl. No.: 08/886,332

[22] Filed: Jul. 1, 1997

[30] Foreign Application Priority Data

| | | | |
|---|---|---|---|
| Jul. 2, 1996 | [DE] | Germany | 196 26 637 |
| Feb. 18, 1997 | [DE] | Germany | 197 06 266 |

[51] Int. Cl.[7] .............................. B32B 31/00; B41J 2/175

[52] U.S. Cl. .......................... 156/256; 156/250; 156/512; 156/517; 156/308.2; 156/559; 156/583.1; 347/86; 347/214

[58] Field of Search ..................... 347/86, 214; 156/250, 156/267, 269, 308.2, 583.1, 559, 563, 264, 256, 512, 517; 428/212, 304.4, 688, 621, 624, 626

[56] References Cited

U.S. PATENT DOCUMENTS

| | | | |
|---|---|---|---|
| 2,772,196 | 11/1956 | Pooley | 156/250 |
| 4,055,699 | 10/1977 | Hsiung | 428/311 |
| 5,199,662 | 4/1993 | Klupt | 243/347.2 |
| 5,637,389 | 6/1997 | Colvin et al. | 428/308.4 |
| 5,735,453 | 4/1998 | Gick et al. | 229/92.8 |

FOREIGN PATENT DOCUMENTS

| | | |
|---|---|---|
| 0709209 | 5/1996 | European Pat. Off. . |

*Primary Examiner*—Richard Crispino
*Assistant Examiner*—Linda L. Gray
*Attorney, Agent, or Firm*—Fay, Sharpe, Fagan, Minnich & McKee, LLP

[57] ABSTRACT

A method of manufacturing an ink cartridge assembly including applying plastic foils to opposite surfaces of a sheet of foam while heating the foils to a temperature above the melting temperature of the foils using a heating press, stamping out a foam body from the sheet, and inserting the body into an ink cartridge housing. Alternatively, the surfaces are covered with a perforated or porous varnish coating or with composite foils of first and second layers having different melting temperatures where the layer with the lower melting temperature is disposed against the sheet of foam.

11 Claims, 1 Drawing Sheet

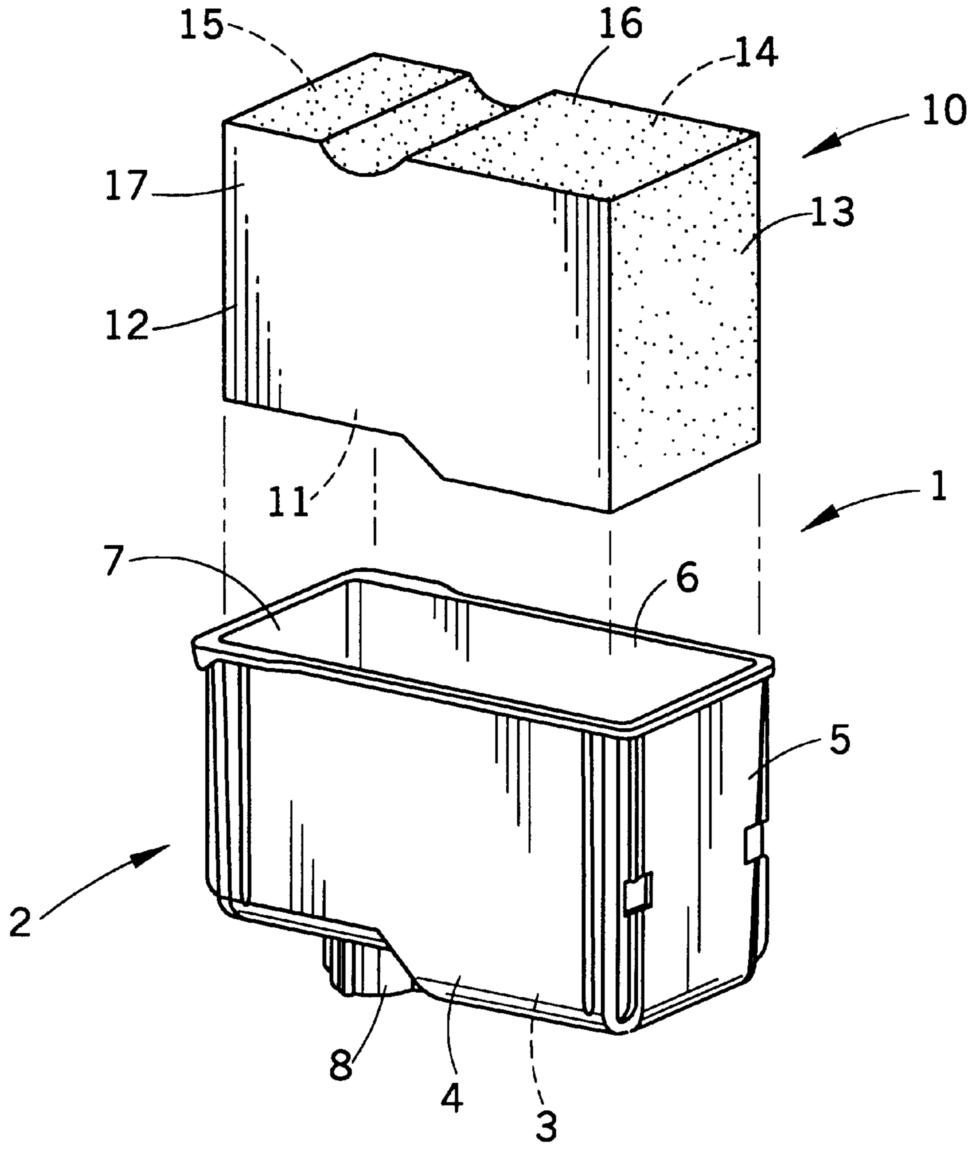
15
16
14
10
17
13
12
11
1
7
6
5
2
8
4
3

PROCESS FOR THE MANUFACTURE OF A FOAM BODY FOR AN INK CARTRIDGE

BACKGROUND OF THE INVENTION

The present invention concerns a process for the manufacture of a foam body for installation in an ink cartridge of an ink jet printer. Such process is known from EP-A-709209. This specification concerns a three-color ink jet print head. These punched-out foam bodies are initially compressed in a heating press and warmed up, so that they settle down. Prior to installation, a jacket is placed around the foam body for the center chamber, which covers a portion of the lower surface and the two large surfaces of the foam body. The jacket consists, for example, of paper. The jacket facilitates the installation of the foam body in the relatively narrow and high center chamber.

SUMMARY OF THE INVENTION

The present invention is based on the object of specifying a process by means of which such laminated foam bodies can be rationally produced. The object is achieved by applying a reduced friction coating to the foam prior to stamping the bodies therefrom. As will be described hereafter, many different coatings can be used.

Still other advantages and benefits of the invention will become apparent to those skilled in the art upon a reading and understanding of the following detailed description.

BRIEF DESCRIPTION OF THE DRAWINGS

In the following, an exemplary embodiment of the invention is explained based on the drawing. The sole FIGURE shows a perspective view of a housing of an ink cartridge with a foam body located thereabove preparatory to being inserted in the housing.

DETAILED DESCRIPTION OF THE PREFERRED EMBODIMENT

Referring now to the drawing wherein the showing is for purposes of illustrating the preferred embodiment of the invention only and not for purposes of limiting same, the ink cartridge 1 has a housing 2 with a bottom 3 and lateral walls 4–7. The upper end is closed by a cover which is not shown. On the bottom 3 there is formed a stub 8 for attachment to a print head of an ink jet printer. In the mounted or assembled state, a foam body 10 is installed in the housing 2. The foam body has a base area 11 shaped generally in accordance with the interior side of the bottom 3, four lateral areas 12–15, and a top area 16. The two broad side areas 12 and 14 are coated with a material which has a significantly lower friction coefficient vis-a-vis the material of the housing 2 than the foam body 10. The coating 17 can, for instance, be a thermoplastic foil, for example PE or PU, attached by hot melt glue, or a tissue, a fleece, or a coating of varnish. The coating may be porous or perforated. It need not necessarily cover the entire surface.

When installing the foam body 10 in housing 2, the foam body is slightly compressed perpendicular to the surfaces 12 and 14. As a result of the coating 17 it is possible to easily insert the foam body into the housing, without corners or edges getting stuck on corners or surfaces of the housing, thus creating empty spaces in the vicinity of the bottom and, adjacent thereto, buckled areas of the foam body 10 with altered capillarity. Both phenomena, which previously were difficult to prevent during installation of the foam body, reduce the available foam volume of the foam body 10.

A better utilization of the interior space of the housing 2 is thus obtained because the foam body slides down into the corners. Simultaneously, a more uniform distribution of pore size is achieved. A less expensive press-in device is needed. Under certain circumstances, prior compressing of the foam body 10 can be waived.

Naturally, the identical benefits also accrue if the foam body 10 is installed directly in a print head, in other words, a print head which is not designed for insertion of exchange cartridges.

Prior to stamping out the foam body 10, the coating 17 is applied to the flat surface of the foam material, from which, subsequently, in one stroke, a multitude of foam bodies are simultaneously punched out with a multiple stamping gauge (band steel knife). coating 17 is applied in a heating press, either simultaneously on both sides or initially on one side only, whereby, subsequently, the foam material sheet is turned and the other side is laminated. If the lamination foil (for example PU or PE) is coated with a hot melt glue, the temperature of the press plate (s) of the heating press is selected between the melting temperature of the hot melt glue and the higher melt temperature of the foil. For an unlaminated foil, a press plate is used which is coated with a non-adhesive material, for instance TEFLON™ commonly referred to as "PTFE", and the plate is heated to a temperature which is higher than the melting temperature of the foil. It is, however, also possible to use a composition foil of two different materials with different melting temperatures, whereby the material with the lower melting temperature is placed facing the foam material plate. If the foam material plate is beforehand compressed in a heating press in order to increase the pore number per volume unit, then the coating 17 can subsequently be sealed in the same heating press.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A method of manufacturing an ink cartridge assembly including a foam body held in a housing, the method comprising the steps of:

providing an ink cartridge housing;

providing a sheet of foam material having opposite face surfaces;

applying a coating to the sheet of foam material by engaging each of the opposite face surfaces with a composite foil formed of layered first and second materials having different melting temperatures so that the one of the first and second materials having a lower melting temperature is in contact with the sheet of foam;

stamping out a foam body from said sheet of foam material; and, inserting said foam body into said ink cartridge housing.

2. The method according to claim 1 wherein said opposite face surfaces of the foam material are simultaneously coated.

3. The method according to claim 1 wherein the foam material is compressed and heated prior to coating so that it settles down, wherein, subsequently, the two foils are sealed on in the same process.

4. The method according to claim 1 wherein after coating, a plurality of foam bodies are simultaneously stamped out of the foam sheet with a multiple punching knife.

5. The method to claim 1 wherein the coatings are perforated.

6. The method according to claim 1 wherein the composite foils are bonded onto each of the opposite face surfaces of the sheet of foam material by melting said one of the first and second materials having a lower melting temperature.

7. A method of manufacturing an ink cartridge assembly including a foam body held in a housing, the method comprising the steps of:

providing an ink cartridge housing;

providing a sheet of foam material having opposite face surfaces;

providing plastic foils;

applying a coating to the opposite face surfaces by holding the plastic foils against the opposite face surfaces of said sheet of foam material while heating the plastic foils to a temperature above the melting temperature of the foils using an associated heated press plate;

stamping out a foam body from said sheet of foam material; and, inserting said foam body into said ink cartridge housing.

8. The method of manufacturing an ink cartridge assembly according to claim 7 wherein the coatings are perforated.

9. The method of manufacturing an ink cartridge assembly according to claim 7 wherein the plastic foils are bonded onto the sheet of foam material by said heating of the plastic foil to said temperature above the melting temperature.

10. A method according of manufacturing an ink cartridge assembly including a foam body held in a housing, the method comprising the steps of:

providing an ink cartridge housing;

providing a sheet of foam material having opposite face surfaces;

applying perforated varnish coatings to said opposite face surfaces of said sheet of foam material;

stamping out a foam body from said sheet of foam material; and, inserting said foam body into said ink cartridge housing.

11. A method of manufacturing an ink cartridge assembly including a foam body held in a housing, the method comprising the steps of:

providing an ink cartridge housing;

providing a sheet of foam material having opposite face surfaces;

applying porous varnish coatings to said opposite face surfaces of said sheet of foam material;

stamping out a foam body from said sheet of foam material; and, inserting said foam body into said ink cartridge housing.

* * * * *